3,517,036
HYDROXY, ACYLOXY AND 11-KETO-1,3,5(10),7-ESTRATETRAENES
Patrick A. Diassi, Westfield, N.J., assignor to E. R. Squibb & Sons, Inc., New York, N.Y., a corporation of Delaware
No Drawing. Filed Nov. 15, 1966, Ser. No. 594,372
Int. Cl. C07c *169/10*
U.S. Cl. 260—397.3  6 Claims

---

ABSTRACT OF THE DISCLOSURE

Hydroxy, acyloxy and 11-keto-1,3,4(10),7-estratetranes are prepared from 19-nor-$\Delta^{4,7}$-androstadienes by a two-step process, entailing initially the hydroxylation or ketonization of the androstadiene to yield hydroxy or 11-keto 19-nor-$\Delta^{4,7}$-androstadiene intermediates, which are new compounds, and then the 1-dehydrogenation of these new intermediates to yield the final products. The estratetraenes are antigonadotropic agents.

---

This invention relates to and has for its object the provision of new hydroxy-7-dehydroestranes (i.e., hydroxy - 1,3,5(10),7 - estratetraenes), acyloxy-7-dehydroestranes and 11-keto-7-dehydroestranes, processes for preparing the same, and new intermediates useful in said processes.

It has been found that a 19-nor-$\Delta^{4,7}$-androstadiene may be converted to a hydroxy-7-dehydroestrane or 11-keto-7-dehydroestrane derivative in high yield by a two-step process without any substantial formation of undesired by-products. In essence, therefore, the process of this invention entails subjecting a 19-nor-$\Delta^{4,7}$-androstadiene to the action of enzymes of a hydroxylating or ketonizing microorganism, whereby a corresponding hydroxy-19-nor - $\Delta^{4,7}$-androstadiene or 11-keto-19-nor-$\Delta^{4,7}$-androstadiene derivative is formed; and subjecting the latter to the action of enzymes of a 1-dehydrogenating microorganism, to yield the desired hydroxy-7-dehydroestrane or 11-keto-7-dehydroestrane final product.

Among the suitable starting steroids are included any of the 19-nor-$\Delta^{4,7}$-androstadienes. The preferred starting steroids, however, are the 3,17-dioxygenated-19-nor-$\Delta^{4,7}$-androstadienes, such as 19-nor-$\Delta^{4,7}$-androstadiene-3,17-dione, 19-nor-7-dehydrotestosterone, 19-nor-17α-methyl-7-dehydrotestosterone and 19-nor-17α-ethynyl - 7 - dehydrotestosterone.

In the first step of the process of this invention, the steroid substrate is subjected to the action of enzymes of a hydroxylating or ketonizing microorganism, the reaction being carried out in the usual manner by culturing the microorganism in the presence of the steroid, or by treating the steroid with non-proliferating cells of the microorganism, or by intermixing the steroid with hydroxylating or ketonizing enzymes previously obtained from the microorganism. The conditions for such microbial reaction are well known in the art and are similar to those specified in U.S. Pat. 3,179,698.

Any known hydroxylating microorganism can be used as the source of the hydroxylating enzyme. Such microorganisms include, inter alia, 11β-hydroxylating microorganisms, such as *Curvularia hellebori* and *Cunninghamella blakesleeana*; 11α-hydroxylating microorganisms, such as *Fusarium javanicum* var. *ensiforme*, *Aspergillus ochraceus*, *Rhizopus nigricans* and *Aspergillus nidulans*; 16α-hydroxylating microorganism, such as *Streptomyces roseochromogenes*, *Hypomyces aurantius*, *Pestalotia funerea*, *Streptomyces viridis*, *Streptomyces olivaceus* and *Streptomyces californicus*; 6-hydroxylating microorganisms, such as *Tricothecium roseum*, *Cunninghamella elegans*, *Rhizopus arrhizus*, *Syncephalastrum racemosum* and *Circinella linderi*; 2α-hydroxylating microorganisms, such as *Streptomyces roseochromogenes* and *Nocardia italica*; 14α-hydroxylating microorganisms, such as *Caldariomyces fumago*, *Helminthosporium buchloes*, *Bacillus cereus* and *Mucor griseocyanus*; 15α-hydroxylating microorganisms, such as *Colletotrium linicola*, *Penicillium sp*. (ATCC11, 598) and *Fusarium orthoceras*; and 12β-hydroxylating microorganisms, such as *Diplodia natalensis*, *Calonectria decora* and *Colletotrichum derridis*.

The first step in the process results in the preparation of the new hydroxy-19-nor-$\Delta^{4,7}$-androstadiene intermediates of this invention. The preferred intermediates are the hydroxy - 3,17-dioxygenated-19-nor-$\Delta^{4,7}$-androstadienes, particularly those of the formula

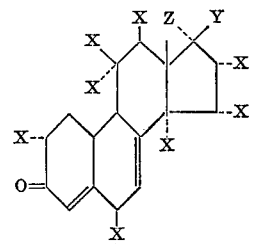

wherein one X is hydroxy and the remaining X's are hydrogen, or where two X's are connected to the same carbon, these two X's can represent oxo (O=); and Y is hydroxy, Z is hydrogen, methyl or ethynyl, or together Y and Z is oxo. The 11-keto compounds can be prepared from the corresponding 11-hydroxy compounds by oxidizing the latter, as by treatment with chromic oxide, or directly by treating a 19-nor-$\Delta^{4,7}$-androstadiene with the enzymes of an 11-ketonizing microorganism, such as *Corticium microsclerotia*.

These hydroxy-19-nor-$\Delta^{4,7}$-androstadienes or 11-keto-19-nor-$\Delta^{4,7}$-androstadienes are then subjected to the action of enzymes of a 1-dehydrogenating microorganism, to yield the desired hydroxy-7-dehydroestrane or 11-keto-7-dehydroestrane final products, the reaction being carried out in the usual manner by culturing the microorganism in the presence of the steroid, or by treating the steroid with non-proliferating cells of the microorganism, or by intermixing the steroid with 1-dehydrogenating enzymes previously obtained from the microorganisms. Optimally, the dehydrogenation is conducted with cell-free extracts of 1-dehydrogenating microorganisms, as by the method and with the enzymes described in U.S. Pat. 3,047,469.

The second step in the process results in the formation of certain of the final products, namely the hydroxy-7-dehydroestrane and 11-keto-7-dehydroestrane derivatives, and preferably the hydroxy-3-17-dioxygenated-7-dehydroestranes and 11-keto-3,17-dioxygenated-7-dehydroestranes. The hydroxy final product may be esterified by treating with an acyl halide or acid anhydride in the presence of a base, such as pyridine, to yield the corresponding esters where the 3- and other hydroxy groups are esterified. The preferred acylating agents are the acyl chlorides or acid anhydrides of hydrocarbon carboxylic acids of less than twelve carbon atoms, as exemplified by the lower aklanoic acids (e.g., acetic, propionic, and hexanoic acid), the lower alkenoic acids, the monocyclic aryl carboxylic acids (e.g., benzoic acid), the monocyclic aryl lower alkanoic acids (e.g., phenylacetic acid and β-phenyl-propionic acid), the lower cycloalkane carboxylic acid, and the lower cycloalkene carboxylic acids. Those of the final products that contain a hydroxy group on a secondary carbon atom can also be oxidized, as by treatment with chromic oxide, to yield the corresponding keto derivatives.

The particularly preferred final products are those of the formula

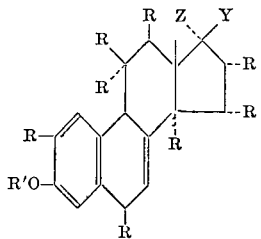

wherein Y and Z are as hereinbefore defined, one R is R'O and the remaining R's are hydrogen, or where two R's are connected to the same carbon atom, these two R's can represent oxo (O=), and R' is hydrogen, or acyl (particularly the acyl radical of a hydrocarbon carboxylic acid of less than twelve carbon atoms).

The final products of this invention are useful as antigonadotropic agents, for which purpose they are administered in the same manner as known estrogens, such as estradiol valerate, in the treatment of symptoms of menopause, etc. They are especially well suited for this purpose since they do not possess any appreciable amount of estrogenic, anti-estrogenic and hypocholesteremic activities.

The following examples illustrate the invention (all temperatures being in centigrade):

EXAMPLE I

11α-hydroxy-19-nor-$\Delta^{4,7}$-androstadiene-3,17-dione (A) *Fermentation.*—Surface growth from each of two 10-day old agar slant cultures of *Fusarium javanicum* var. *ensiforme* (QM–524) (Army Quartermaster, Natick, Mass.), the slant containing as a nutrient medium (A):

| | Grams |
|---|---|
| Glucose | 10 |
| Yeast extract | 2.5 |
| K$_2$HPO$_4$ | 1 |
| Agar | 20 |
| Distilled water to 1 liter. | | is suspended in 5 ml. of a 0.01% sodium lauryl sufate aqueous solution. One ml. portions of the suspension are used to inoculate five 250 ml. concial flasks, each containing 50 ml. of the following sterilized medium (B):

| | Grams |
|---|---|
| Dextrose | 10 |
| Corn steep liquor | 6 |
| NH$_4$H$_2$PO$_4$ | 3 |
| Yeast extract | 2.5 |
| CaCO$_3$ | 2.5 |
| Distilled water to 1 liter. | |

After 72 hours of incubation at 25° with continuous rotary agitation (280 cycles/minute, 2 inch stroke) 10% 10% (vol./vol.) transfers are made to ten 250 ml. conical flasks each containing 50 ml. of fresh sterilized medium B plus 3 milligrams ml. of 19 - nor - $\Delta^{4,7}$-androstadiene-3,17-dione. The steroid is added by supplementing each flask with 0.50 ml. of a sterile solution of the steroid in N,N-dimethylformamide containing 300 mg./ml. of steroid. A total of 1.5 grams is used. After 7 days of further incubation, the contents of the flasks are pooled through a Seitz clarifying pad. The flasks, mycelium and pads are washed with successive 50 ml. portions of warm water. The combined filtrate and washings have a volume of 500 ml.

(B) *Isolation.*—The combined filtrate and washings (500 ml.) are extracted three times with 160 ml. portions of chloroform. The combined chloroform extracts are washed with water, dried over anhydrous sodium sulfate and concentrated to dryness under vacuum, leaving about 520 mg. of crude product. This material is chromatographed on a thin layer of Silica Gel GF (Merck) with chloroform containing 5% (by volume) methanol as the developing solvent. The major u.v.-absorbing band is eluted with a 1:1 (by volume) mixture of methanol and chloroform. After evaporating off the solvent the residue is partitioned between chloroform and a 1:1 (by volume) mixture of water and methanol. The choloform phase, upon evaporation under vacuum to dryness, yields crystalline 11α-hydroxy-19-nor-$\Delta^{4,7}$-androstadiene-3,17-dione.

EXAMPLE 2

11α-hydroxy-7-dehydro-19-nortestosterone

Following the procedure of Example 1, but substituting an equivalent amount of 7-dehydro-19-nortestosterone for the 19-nor-$\Delta^{4,7}$-androstadiene-3,17-dione and *Aspergillus ochraceus* (NRRL–405) for the *Fusarium javanicum*, the 11α - hydroxy - 7-dehydro-19-nortestosterone crystallizes directly from the chloroform extract upon evaporation without purification by the thin layer chromatography.

Similarly, by following the procedure of Example 1, but substituting the following microorganisms for the Fusarium used in the example, 11α-hydroxy-19-nor-$\Delta^{4,7}$-androstadiene-3,17-dione is obtained: *Rhizopus nigricans* ATCC 15441, and Aspergillus nidulans ATCC 11267.

Moreover, by substituting the following steroid substrates for the 19-nor-$\Delta^{4,7}$-androstadiene-3,17-dione in the procedure of Example 1, the indicated product is obtained:

| Steroid substrate | Product |
|---|---|
| 19-nor-17α-methyl-7-dehydrotestosterone. | 11α-hydroxy-19-nor-17α-methyl-7-dehydrotestosterone. |
| 19-nor-17α-ethynyl-7-dehydrotestosterone. | 11α-hydroxy-19-nor-17α-ethynyl-7-dehydrotestosterone. |

EXAMPLE 3

11β-hydroxy-19-nor-$\Delta^{4,7}$-androstadiene-3,17-dione

Following the procedure of Example 1, but substituting *Coniothyrium hellebori* (ATCC 12522) for the microorganism used in Example 1, 11β-hydroxy-19-nor-$\Delta^{4,7}$-androstadiene-3,17-dione is obtained.

Similarly, *Curvularia lunata* (QM–120–L) and *Cunninghamella blakesleeana* ATCC 8688a also yield 11β-hydroxy-19-nor-$\Delta^{4,7}$-androstadiene-3,17-dione.

EXAMPLE 4

6β-hydroxy-19-nor-$\Delta^{4,7}$-androstadiene-3,17-dione

Following the procedure of Example 1, but substituting *Tricothecium roseum* (ATCC12519) for the microorganism used in Example 1, 6β-hydroxy-19-nor-$\Delta^{4,7}$-androstadiene-3,17-dione is obtained.

EXAMPLE 5

19-nor-$\Delta^{4,7}$-androstadiene-3,11,17-trione (A) *Fermentation.*—Surface growth from each of two 10-day old agar slant cultures of *Corticium microsclerotia* (NRRL-2727), the slant containing as a nutrient medium (A):

| | Grams |
|---|---|
| Oatmeal | 20 |
| Tomato paste | 20 |
| Agar | 15 |
| Distilled water to 1 liter. | | is suspended in 6 ml. of a 0.01% sodium lauryl sulphate aqueous solution. Three ml. portions of the suspension are used to inoculate four 250 ml. conical flasks, each containing 50 ml. of the following sterilized medium (B):

| | Grams |
|---|---|
| Glucose | 30 |
| Soy bean meal | 20 |
| Soy bean oil | 2.2 |
| CaCO$_3$ | 2.5 |
| Distilled water to 1 liter. | |

After 72 hours of incubation at 25° with continuous rotary agitation (280 cycles/minute; 2 inch stroke) 10% (vol./vol.) transfers are made to twenty 250 ml. conical flasks, each containing 50 ml. of the following sterilized medium (C):

| | Grams |
|---|---|
| Dextrose | 10 |
| Corn steep liquor | 6 |
| $NH_4H_2PO_4$ | 3 |
| Yeast extract | 2.5 |
| $CaCO_3$ | 2.5 |

Distilled water to 1 liter.

After 24 hours of incubation, using the same conditions as described above, the steroid (500 micrograms/ml.) is added by supplementing each flask with 0.25 ml. of a sterile solution (100 mg./ml.) of 19-nor-$\Delta^{4,7}$-androstadiene-3,17-dione in N,N-dimethylformamide. A total of 500 mg. is fermented. After approximately 10 hours of further incubation using identical conditions as described above, the fermentation is harvested. The contents of the flasks are pooled; the broth has a volume of 1,000 ml.

(B) *Isolation.*—The broth is extracted three times with 200 ml. portions of chloroform. The combined chloroform extracts are washed with water, dried over anhydrous sodium sulfate and concentrated to dryness under vacuum, leaving about 150 mg. of crude product. This material is chromatographed on a thin layer of Silica Gel GF (Merck) with chloroform containing 5% (by volume) methanol as the developing solvent. The u.v.-absorbing band which moves with $8/10$ the mobility of the substrate, 19-norandrostenedione, is eluted with a 1:1 (by volume) mixture of methanol and chloroform. After evaporating off the solvent the residue is partitioned between chloroform and a 1:1 (by volume) mixture of water and methanol. The chloroform phase, upon evaporation under vacuum to dryness, yields crystalline 11-keto-19-nor-$\Delta^{4,7}$-androstadiene-3,17-dione.

EXAMPLE 6

2α-hydroxy-19-nor-$\Delta^{4,7}$-androstadiene-3,17-dione (A) *Fermentation.*—Surface growth from each of two 10-day old agar slant cultures of *Streptomyces roseochromogenes* (ATCC 13400), the slant containing as a nutrient medium (A):

| | Grams |
|---|---|
| Glucose | 10 |
| Yeast extract | 2.5 |
| $K_2HPO_4$ | 1 |
| Agar | 20 |

Distilled water to 1 liter.

is suspended in 5 ml. of a 0.01% sodium lauryl sulphate aqueous solution. One ml. portion of the suspension is used to inoculate eight 250 ml. conical flasks, each containing 50 ml. of the following sterilized medium (B):

| | Grams |
|---|---|
| Glucose | 30 |
| Soy bean meal | 20 |
| Soy bean oil | 2.2 |
| $CaCO_3$ | 2.5 |

Distilled water to 1 liter.

After 72 hours of incubation at 25° with continuous rotary agitation (280 cycles/minutes, 2 inch stroke) 10% (vol./vol.) transfers are made to one hundred 250 ml. conical flasks, each containing 50 ml. of freshly sterilized medium B. After 24 hours of further incubation, using the same conditions as described above, the steroid (300 micrograms/ml.) is added by supplementing each flask with 0.25 ml. of a sterile solution (60 mg./ml.) of 19-nor-$\Delta^{4,7}$-androstadiene-3,17-dione in N,N-dimethylformamide. A total of 1.5 g. is fermented. After approximately 78 hours of further incubation, using identical conditions as described above, the fermentation is harvested The contents of the flasks are pooled through a Seitz clarifying pad. The flasks, mycelium and pads are washed with successive 100 ml. portions of warm water. The combined filtrate and washings have a volume of 5500 ml.

(B) *Isolation and characterization.*—The combined filtrate and washings (5500 ml.) are extracted three times with 1500 ml. portions of chloroform. The combined chloroform extracts are washed with water, dried over anhydrous sodium sulfate and concentrated to dryness under vacuum, leaving about 900 mg. of crude product. This material is chromatographed on a thin layer of Silica Gel GF (Merck) with chloroform containing 5% (by volume) methanol as the developing solvent. The u.v.-absorbing band which moves with $8/10$ the mobility of the substrate, 19-norandrostenedione, is eluted with a 1:1 (by volume) mixture of methanol and chloroform. After evaporating off the solvent, the residue is partitioned between chloroform and 1:1 (by volume) mixture of water and methanol. The chloroform phase, upon evaporation under vacuum to dryness, yields crystalline 2α-hydroxy-19-nor-$\Delta^{4,7}$-androstadiene-3,17-dione.

EXAMPLE 7

Following the procedure of Example 6, but substituting *Nocardia italica* for the *Streptomyces roseochromogenes* 2α - hydroxy - 19 - nor - $\Delta^{4,7}$ - androstadiene - 3,17 - dione is obtained.

Similarly, by substituting the following steroid substrates for the 19-nor-$\Delta^{4,7}$-androstadiene-3,17-dione in the procedure of Example 6, the indicated product is obtained:

| Steroid substrate | Product |
|---|---|
| 19-nor-17α-methyl-7-dehydrotestosterone. | 2α-hydroxy-19-nor-17α-methyl-7-dehydrotestosterone. |
| 19-nor-17α-ethynyl-7-dehydrotestosterone. | 2α-hydroxy-19-nor-17α-ethynyl-7-dehydrotestosterone. |
| 19-nor-7-dehydrotestosterone. | 2α-hydroxy-19-nor-7-dehydrotestosterone. |

EXAMPLE 8

16α-hydroxy-19-nor-$\Delta^{4,7}$-androstadiene-3,17-dione (A) *Fermentation.*—Surface growth from each of 2 10-day old agar slant cultures of *Streptomyces roseochromogenes* (ATCC 13400), the slant containing as a nutrient medium (A):

| | Grams |
|---|---|
| Glucose | 10 |
| Yeast extract | 2.5 |
| $K_2HPO_4$ | 1 |
| Agar | 20 |

Distilled water to 1 liter.

is suspended in 5 ml. of a 0.01% sodium lauryl sulfate aqueous solution. One ml. portions of the suspension are used to inoculate eight 250 ml. conical flasks, each containing 50 ml. of the following sterilized medium (B):

| | Grams |
|---|---|
| Glucose | 30 |
| Soy bean meal | 20 |
| Soy bean oil | 2.2 |
| $CaCO_3$ | 2.5 |

Distilled water to 1 liter.

After 72 hours of incubation at 25° with continuous rotary agitation (280 cycles/minute, 2 inch stroke) 10% (vol./vol.) transfers are made to 34 250 ml. conical flasks each containing 50 ml. of freshly sterilized medium B. After 24 hours of further incubation, using the same conditions as described above, the steroid (300 micrograms/ml.) is added by supplementing each flask with 0.25 ml. of a sterile solution (60 mg./ml.) of 19-nor-$\Delta^{4,7}$-androstadiene-3,17-dione in N,N-dimethylformamide. A total of 510 mg. is fermented. After approximately 78 hours of further incubation, using identical conditions as described above, the fermentation is harvested. The contents of the flasks are pooled through a Seizt clarifying pad. The flasks, mycelium and pads are washed with successive 50 ml. portions of warm water. The combined filtrate and washings have a volume of 2,000 ml.

(B) *Isolation and characterization.*—The combined filtrate and washings (2,000 ml.) are extracted three times with 500 ml. portions of chloroform. The combined chloroform extracts are washed with water, dried over anhydrous sodium sulfate and concentrated to dryness under vacuum, leaving about 300 mg. of crude product. This material is chromatographed on a thin layer of Silica Gel GF (Merck) with chloroform containing 5% (by volume) methanol as the developing solvent. The major u.v.-absorbing band is eluted with a 1:1 (by volume) mixture of methanol and chloroform. After evaporating off the solvent, the residue is partitioned between chloroform and 1:1 (by volume) mixture of water and methanol. The chloroform phase, upon evaporation under vacuum to dryness, yields crystalline 16α-hydroxy-19-nor-$\Delta^{4,7}$-androstadiene-3,17-dione.

EXAMPLE 9

Following the procedure of Example 8, but substituting *Hypomyces aurantius* (CBS) (Centraal bureau voor Schimmelcultures, Baarn, Netherlands), for the *Streptomyces roseochromogenes*, 16α-hydroxy-19-nor-$\Delta^{4,7}$-androstadiene-3,17-dione is obtained.

Similarly, by following the procedure of Example 8, but substituting the following microorganisms for the Streptomyces used in the example, 16-αhydroxy-19-nor-$\Delta^{4,7}$-androstadiene-3,17-dione is obtained: *Streptomyces viridis* ATCC–3372, *Pestalotia junerea* (Dept. of Botany, Kansas State University, Manhattan, Kansas), *Streptomyces olivaceus* ATCC–11626, and *Streptomyces californicus* ATCC–3312.

EXAMPLE 10

14α-hydroxy-19-nor-$\Delta^{4,7}$-androstadiene-3,17-dione

Following the procedure of Example 1, but substituting *Caldariomyces fumago* (ATCC–11925) for the microorganism used in the example, 14α-hydroxy-19-nor-$\Delta^{4,7}$-androstadiene-3,17-dione is obtained.

EXAMPLE 11

15α-hydroxy-19-nor-$\Delta^{4,7}$-androstadiene-3,17-dione

Following the procedure of Example 1, but substituting *Colletotrichum linicola* (NCTC–1194) for the microorganism used in Example 1, 15α-hydroxy-19-nor-$\Delta^{4,7}$-androstadiene-3,17-dione is obtained.

EXAMPLE 12

12β-hydroxy-19-nor-$\Delta^{4,7}$-androstadiene-3,17-dione

Following the procedure of Example 1, but substituting *Diplodia natalensis* (ATCC–9055) for the microorganism used in the example, 12β-hydroxy-19-nor-$\Delta^{4,7}$-androstadiene-3,17-dione is obtained.

EXAMPLE 13

11α-hydroxy-7-dehydroestrone (A) *Fermentation.*—Surface growth from a two-week old agar slant of *Corynebacterium simplex* (ATCC 6946), the slants containing as a nutrient medium (A):

| | Grams |
|---|---|
| Glucose | 10 |
| Yeast extract | 2.5 |
| K₂HPO₄ | 1 |
| Agar | 20 |
| Distilled water to 1 liter. | | is suspended in 5 ml. of 0.01% aqueous sodium lauryl sulfate solution. One ml. portions of this suspension are used to inoculate four 250 Erlenmeyer flasks, each containing 50 ml. of the following sterilized medium (B):

| | Grams |
|---|---|
| Beef extract | 1.5 |
| Yeast extract | 3 |
| Peptone | 6 |
| Dextrose | 1 |
| Distilled water to 1 liter. | |

After 24 hours of incubation at 25° with continuous rotary agitation (280 cycles/minute; 2 inch stroke), 5% (vol./vol.) transfers are made to eight 250 ml. Erlenmeyer flasks each containing 50 ml. of freshly sterilized medium B. After 24 hours of further incubation, using the same conditions as described above, the steroid, (500 milligrams/ml.) is added by supplementing each flask with 0.25 ml. of a sterile solution (100 mg./ml.) of 11α-hydroxy-19-nor-$\Delta^{4,7}$-androstadiene-3,17-dione in N,N-dimethylformamide. A total of 200 mg. is fermented. After 48 hours of further incubation, using identical conditions as described above, the contents of the flasks are pooled, and the broth is extracted three times with 200 ml. portions of methyl isobutyl ketone.

The methyl isobutyl ketone extract is washed with water, dried over anhydrous Na₂SO₄, and evaporated under vacuum to dryness. The evaporation residue is chromatographed on a thin layer of Silica Gel GF (Merck) with chloroform containing 10% (by volume) of methanol as the developing solvent. The major phenolic band as detected by spraying the edge of the thin layer plate with a ferric ferricyanide reagent (Barton, et al., Nature 170, 249 (1952)) is eluated with a 1:1 (by volume) methanol-chloroform. After evaporating the eluate to dryness, the residue is partitioned between equal volumes of chloroform and a 1:1 (by volume) methanol-water mixture. The chloroform phase is replaced twice and the three chloroform partitionates are combined, dried over anhydrous sodium sulfate, and evaporated to dryness. The evaporation residue is virtually pure 11α-hydroxy-7-dehydroestrone.

EXAMPLE 14

Following the procedure of Example 13 with the exception that either 11α-hydroxy-19-nor-$\Delta^{4,7}$-androstadiene-3, 17-dione or progesterone is added, the cells of the culture of *Cornyebacterium simplex* are harvested at the end of 72 hours by centrifugation for ten minutes at 2000×G. The supernatant is decanted off and the cells are placed in a mortar along with an equal amount by weight of alumina (finely powdered) and treated in a Raytheon magneto-strictive oscillator for 20 minutes. The sonicated mixture is centrifuged for ten minutes at 2000×G to remove the cell debris and alumina.

11α-hydroxy-19-$\Delta^{4,7}$-androstadiene-3,17-dione (1 mg.), 2,6-dichlorophenol indophenol (500 μg.) or other hydrogen acceptor, such as 2-methylnaphthoquinone and 2.0 ml. of the cell-free ring A dehydrogenase preparation, described above, are placed in a test tube and brought to a volume of 5.0 ml. with a 0.03 M sodium phosphate buffer. The mixture is allowed to stand for one hour at 30° C. after which it is twice extracted with 1 ml. of methyl isobutyl ketone. The combined extract is chromatographed on paper using ethylene glycol as the stationary phase and a mixture of equal volumes of benzene and chloroform as the mobile phase. A spot moving with the same $R_f$ (0.10) and exhibiting the same characteristic color reactions as the 11α-hydroxy-7-dehydroestrone obtained in Example 13 is observed.

Similarly, by following the procedures of Example 13 or 14, but substituting 11α-hydroxy-19-nor-17α-methyl-7-dehydrotestosterone, 11α-hydroxy-19-nor-17α-ethynyl-7-dehydrotestosterone, and 11α-hydroxy-19-nor-7-dehydrotestosterone for the 11α-hydroxy-19-nor-$\Delta^{4,7}$-androstadiene-3,17-dione, the corresponding 11α-hydroxy-7-dehydroestrane derivatives are obtained.

Similarly, by substituting the following 1-dehydrogenating microorganisms for the *Corynebacterium simplex* in Examples 13 and 14, the same products are formed: *Nocardia restrictus* ATCC 14,887, *Pseudomonas testosteroni* ATTC 11,996, *Cylindrocarpon radicicola* ATTC 11,011, and *Mycobacterium rhodochrous* ATCC 4277.

EXAMPLE 15

2-hydroxy-7-dehydroestrone by growing culture of *Corynebacterium simplex*

(A) *Fermentation.*—Surface growth from a two-week-old agar slant of *Corynebacterium simplex* (ATCC 6946), the slants containing as a nutrient medium (A):

| | Grams |
|---|---|
| Glucose | 10 |
| Yeast extract | 2.5 |
| $K_2HPO_4$ | 1 |
| Agar | 20 |

Distilled water to 1 liter.

is suspended in 5 ml. of 0.01% aqueous sodium lauryl sulfate solution. One ml. portions of this suspension are used to inoculate four 250 ml. Erlenmeyer flasks, each containing 50 ml. of the following sterilized medium (B):

| | Grams |
|---|---|
| Beef extract | 1.5 |
| Yeast extract | 3 |
| Peptone | 6 |
| Dextrose | 1 |

Distilled water to 1 liter.

After 24 hours of incubation at 25° with continuous rotary agitation (280 cycles/minute, 2 inch stroke), 5% (vol./vol.) transfers are made to eight 250 ml. Erlenmeyer flasks each containing 50 ml. of freshly sterilized medium B. After 24 hours of further incubation, using the same conditions as described above, the steroid, (500 micrograms/ml.) is added by supplementing each flask with 0.25 ml. of a sterile solution (100 mg./ml.) of 2α-hydroxy-19-nor-$\Delta^{4,7}$-androstadiene-3.17-dione in N,N-dimethylformamide. A total of 200 mg. is fermented. After 48 hours of further incubation, using identical conditions as described above, the contents of the flasks are pooled, and the broth is extracted three times with 200 ml. portions of methyl isobutyl ketone. Upon evaporation of the combined extract under vacuum to dryness, crystalline 2-hydroxy-7-dehydroestrone is obtained.

EXAMPLE 16

2-hydroxy-7-dehydroestrone by washed cells of *Corynebacterium simplex*

Following the procedure of Example 15 with the exception that testosterone is used in place of 2α-hydroxy-19-nor-$\Delta^{4,7}$-androstadiene-3,17-dione, the cells of the culture of *Corynebacterium simplex* are harvested at the end of 72 hours by centrifugation. The packed cells are washed three times with a phosphate buffer containing 0.005 mole each of $KH_2PO_4$ and $Na_2H_2P_2O_7$ per liter and adjusted to pH 7.0. The washed cells are then suspended in the same phosphate buffer to a volume equal to one-quarter of the volume of the original culture. The substrate, 2α-hydroxy-19-nor-$\Delta^{4,7}$-androstadiene-3,17-dione and the hydrogen acceptor, e.g., 2-methylnaphthoquinone are added as their solutions in ethanol to give final concentrations of 100 μg./ml. and 0.4 mM., respectively, the quantity of ethanol introduced being held within 5% of the total. The reaction mixture is allowed to stand at 30° and 4 to 6 hours, after which it is extracted twice with one-quarter of its volume of methyl isobutyl ketone. The methyl isobutyl ketone extract is washed twice with water and dried over anhydrous sodium sulfate. Upon evaporating off the solvent to dryness, 2-hydroxy-7-dehydroestrone is obtained as crystalline residue.

EXAMPLE 17

2-hydroxy-7-dehydroestrone by cell-free enzyme preparation from *Corynebacterium simplex*

Following the procedure of Example 16, the packed cells are placed in a mortar along with an equal amount by weight of alumina (finely powdered) and treated in a Raytheon magneto-strictive oscillator for 20 minutes. The sonicated mixture is centrifuged for ten minutes at 2000×G to remove cell debris and alumina. The substrate, 2α - hydroxy-19-nor-$\Delta^{4,7}$-androstadiene-3,17-dione (1 mg.) and the hydrogen acceptor, e.g., 2-methyl-naphthoquinone (1 mg.) are added to 2 ml. of this cell-free ring-A dehydrogenase preparation which has been diluted to 5 ml. with pH 7.0 phosphate buffer in the same manner as described in Example 16. The mixture is allowed to stand for one hour at 30°. The combined extract is chromatographed on paper using ethylene glycol as the stationary phase and benzene as the mobile phase. A spot moving with the same Rf (0.15) and exhibiting the same characteristic color reactions as the 2-hydroxy-7-dehydroestrone obtained in Example 16 is observed.

Similarly, by following the procedures of Examples 15 and 16 or 17, but substituting 2α-hydroxy-19-nor-17α-methyl-7-dehydrotestosterone, 2α-hydroxy - 19 - nor-17α-ethynyl-7-dehydrotestosterone, and 2α-hydroxy-19-nor-7-dehydrotestosterone for the 2α-hydroxy-19-nor-$\Delta^{4,7}$-androstadiene-3,17-dione, the corresponding 2-hydroxy-7-dehydroestrane derivatives are obtained.

EXAMPLE 18

11β-hydroxy-7-dehydroestrone

Following the procedure of Example 13, but substituting 11β-hydroxy-19-nor-$\Delta^{4,7}$-androstadiene-3,17-dione, for the steroid, 11β-hydroxy-7-dehydroestrone is obtained.

EXAMPLE 19

6β-hydroxy-7-dehydroestrone

Following the procedure of Example 13, but substituting 6β-hydroxy-19-nor-$\Delta^{4,7}$-androstadiene-3,17-dione for the steroid, 6β-hydroxy-7-dehydroestrone is obtained.

EXAMPLE 20

16α-hydroxy-7-dehydroestrone

Following the procedure of Example 13, but substituting 16α-hydroxy-19-nor-$\Delta^{4,7}$-androstadiene-3,17-dione for the steroid, 16α-hydroxy-7-dehydroestrone is obtained.

EXAMPLE 21

14α-hydroxy-7-dehydroestrone

Following the procedure of Example 13, but substituting 14α-hydroxy-19-nor-$\Delta^{4,7}$-androstadiene-3,17-dione for the steroid, 14α-hydroxy-7-dehydroestrone is obtained.

EXAMPLE 22

15α-hydroxy-7-dehydroestrone

Following the procedure of Example 13, but substituting 15α-hydroxy-19-nor-$\Delta^{4,7}$-androstadiene-3,17-dione for the steroid, 15α-hydroxy-7-dehydroestrone is obtained.

EXAMPLE 23

12β-hydroxy-7-dehydroestrone

Following the procedure of Example 13, but substituting 12β-hydroxy-19-nor-$\Delta^{4,7}$-androstadiene-3,17-dione for the steroid, 12β-hydroxy-7-dehydroestrone is obtained.

EXAMPLE 24

11α-hydroxy-7-dehydroestrone 3,11-diacetate

A solution of 100 mg. of 11α-hydroxy-7-dehydroestrone in 5 ml. of dry pyridine and 2 ml. of acetic anhydride is kept at room temperature for 16 hours. Ice is then added and the mixture slowly diluted with water. The precipitate which separates is filtered and washed well with water and recrystallized to give 11α-hydroxy-7-dehydroestrone 3,11-diacetate.

Similarly, by following the procedure of Example 24, but substituting the following other steroids for the 11α-hydroxy-7-dehydroestrone, the corresponding diacetates are formed: 2-hydroxy-7-dehydroestrone, 6β-hydroxy-7-dehydroestrone, 15α-hydroxy-7-dehydroestrone and 16α-hydroxy-7-dehydroestrone.

Moreover, if another acylating agent, such as propionic anhydride and benzoyl chloride, is substituted for the acetic anhydride in the procedure of Example 24, the corresponding 3,11-diester is obtained.

EXAMPLE 25

19-nor-$\Delta^{4,7}$-androstadiene-3,11,17-trione

To a solution of 100 mg. of 11α-hydroxy-19-nor-$\Delta^{4,7}$-androstadiene-3,17-dione in 10 ml. of reagent grade acetone are added dropwise a solution containing 200 mg./ml. of chromic anhydride and 320 mg./ml. of sulfuric acid in acetone-water (9:1, v:v) until an amber color persists. A few drops of methanol are then added and the mixture diluted with water and extracted with chloroform. The chloroform is evaporated and the residue crystallized to give 19-nor-$\Delta^{4,7}$-androstadiene-3,11,17-trione.

Similarly, by substituting 11β-hydroxy-19-nor-$\Delta^{4,7}$-androstadiene-3,17-dione for the 11α-hydroxy isomer in the above procedure, 19-nor-$\Delta^{4,7}$-androstadiene-3,11,17-trione is obtained.

EXAMPLE 26

11-keto-7-dehydroestrone

Following the procedure of Example 13, but substituting 19-nor-$\Delta^{4,7}$-androstadiene-3,11,17-trione for the steroid, 11-keto-7-dehydroestrone is obtained.

The invention may otherwise be embodied within the scope of the appended claims.

What is claimed is:

1. A compound having the formula:

wherein one X is hydroxy and the remaining X's are hydrogen, or where two X's are connected to the same carbon, these two X's can be oxo; Y is hydroxy, Z is hydrogen, methyl or ethynyl, or together Y and Z is oxo.

2. A compound having the formula:

wherein one R is R'O and the remaining R's are hydrogen, or where two R's are connected to the same carbon atom, these two R's can be oxo; R' is hydrogen or the acyl radical of a hydrocarbon carboxylic acid of less than twelve carbon atoms; Y is hydroxy, Z is hydrogen, methyl or ethynyl, or together Y and Z is oxo.

3. A compound having the formula:

wherein one X is hydroxy and the remaining X's are hydrogen.

4. The compound of claim 1 having the name 11α-hydroxy-19-nor-$\Delta^{4,7}$-androstadiene-3,17-dione.

5. The compound of claim 1 having the name 19-nor-$\Delta^{4,7}$-androstadiene-3,11,17-trione.

6. The compound of claim 3 having the name 11α-hydroxy-7-dehydroestrone.

References Cited

UNITED STATES PATENTS

| 3,325,519 | 6/1967 | Krüger | 260—397.4 |
| 3,470,159 | 9/1969 | Marshall | 260—239.55 |

LEWIS GOTTS, Primary Examiner

E. G. LOVE, Assistant Examiner

U.S. Cl. X.R.

195—51; 260—397.4, 397.45, 397.5, 999

PO-1050
(5/69)

UNITED STATES PATENT OFFICE
CERTIFICATE OF CORRECTION

Patent No. 3,517,036          Dated June 23, 1970

Inventor(s) Patrick A. Diassi

It is certified that error appears in the above-identified patent and that said Letters Patent are hereby corrected as shown below:

Column 2, line 56, "product" should read--products--. Column 3, line 46, "concial" should read--conical--. Column 3, line 58, delete--10%--. Column 3, line 60, "milligrams ml." should read--milligrams/ml.--. Column 5, line 66, "minutes" should read--minute--. Column 7, line 3, "Seizt" should read--Seitz--. Column 7, line 32, "16-αhydroxy-" should read--16α-hydroxy--. Column 9, line 5, "ATTC" should read--ATCC--. Column 9, line 40, "3.17" should read--3,17--. Column 9, line 69, "and" should read--for--. Claim 1 in the formula should be:

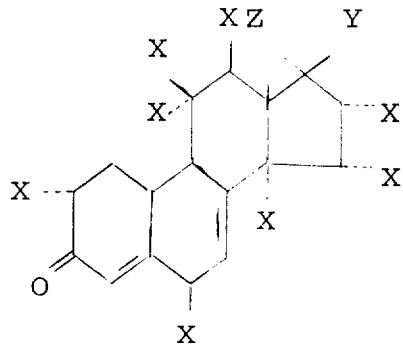

Claim 3 in the formula should be:

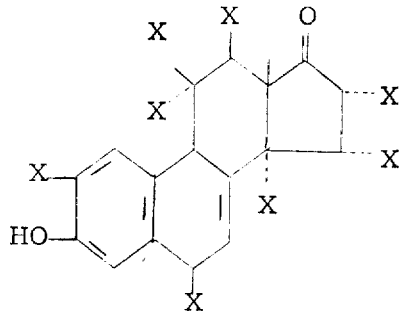

Signed and sealed this 30th day of March 1971.

(SEAL)
Attest:

EDWARD M. FLETCHER, JR.          WILLIAM E. SCHUYLER, JR.
Attesting Officer                   Commissioner of Patents